United States Patent [19]
Cable

[11] Patent Number: 5,999,728
[45] Date of Patent: Dec. 7, 1999

[54] METHOD AND APPARATUS FOR ENHANCING THE PORTABILITY OF AN OBJECT ORIENTED INTERFACE AMONG MULTIPLE PLATFORMS

[75] Inventor: Laurence P. G. Cable, Mountain View, Calif.

[73] Assignee: Sun Microsystems, Inc., Palo Alto, Calif.

[21] Appl. No.: 08/681,917

[22] Filed: Jul. 30, 1996

[51] Int. Cl.⁶ .................................................. G06F 9/00
[52] U.S. Cl. ............................................................ 395/701
[58] Field of Search .................................. 395/701, 683; 345/682

[56] References Cited

U.S. PATENT DOCUMENTS

| | | | |
|---|---|---|---|
| 5,446,902 | 8/1995 | Islam ........................................ | 395/703 |
| 5,596,702 | 1/1997 | Stucka et al. ........................... | 395/340 |
| 5,627,979 | 5/1997 | Chang et al. ........................... | 345/335 |
| 5,713,045 | 1/1998 | Berdahl .................................. | 395/893 |

*Primary Examiner*—Kevin J. Teska
*Assistant Examiner*—Ayni Mohamed
*Attorney, Agent, or Firm*—William J. Kubida; Robert H. Kelly; Holland & Hart LLP

[57] ABSTRACT

The present invention is directed to providing an ability to re-host, or port, an object oriented graphical user interface implementation from a native window-based platform, or environment, to another window-based platform, or environment. Exemplary embodiments abstract any notifications (e.g., events, state changes or "interests") which occur in the native environment as behavioral specifications. These behavioral specifications, (i.e., traits or protocols) can be used as part of a conformance negotiation to determine, during the execution lifetime of the graphical user interface, whether a particular client side object will conform with the behavioral specifications which have been abstracted from server side events associated with a different object. Where the conformance negotiation proves successful, abstract notifications can flow between particular instances of objects to model the state of the system, rather than using native implementations of events. During the execution lifetime, other objects can dynamically establish relationships with object classes containing abstracted notifications for the purpose of receiving the abstracted notifications.

7 Claims, 4 Drawing Sheets

METHOD AND APPARATUS FOR ENHANCING THE PORTABILITY OF AN OBJECT ORIENTED INTERFACE AMONG MULTIPLE PLATFORMS

BACKGROUND OF THE INVENTION

1. Field of the Invention

The present invention relates generally to network-based graphical user interfaces. More particularly, the present invention relates to systems and methods for enhancing the portability and maintainability of an object oriented interface among multiple platforms such that the interface can, for example, be used with a client/server environment that integrates any of a variety of different hardware and/or software platforms.

2. State of the Art

Known graphical user interfaces provide application developers with an application program interface (API) that includes a collection of objects, such as scroll bars, push buttons, text entry fields and so forth. An object oriented graphical user interface (GUI) typically includes a hierarchical collection of these objects in a "toolkit".

The behavior of a graphical user interface within a system is defined by interactions between the objects in the client of a client/server environment and the window-based system server. A paradigm used to represent defined interactions between the objects is often referred to as a "model-view-controller" (MVC) paradigm of object interaction. The model-view-controller paradigm formally defines the manner by which changes in state occur within at least part of the system (e.g., a timer of the system), and how those changes are to be communicated to, or reflected in, other parts of the system that have established an interest in observing such state changes (such as a displayed clock). The controller can be considered a set of rules which define how state changes implemented in response to a model will affect a view. Using the model-view-controller paradigm, the toolkit can be considered a hierarchical collection of models, views and controllers that implement the graphical user interface.

FIG. 1A illustrates an abstract representation of interaction among a model 102, a view 104 and a controller 106, wherein the model can be considered stored data, and the controller can be considered the rules by which the model and the view interact. Arrows 108 in FIG. 1A depict the most general model-view-controller paradigm wherein state changes can flow in both directions.

Referring to FIG. 1B those skilled in the art will appreciate that the distinctions between the model, the view and the controller often overlap in implementation even though the model, the view and the controller are conceptually distinct. For example, a scroll bar object 112 of an object oriented graphical user interface can represent both a controller as well as a view. The scroll bar of FIG. 1B is a view when, for example, it graphically represents the percentage of a text file 114 which has been, or is being, displayed in a text view 116 (i.e., anywhere from zero percent to 100 percent). The scroll bar responds to a series of control events generated by a mouse to display the current location of the scroll bar on a monitor. As referenced herein, an "event" represents information of a state change which is particular to implementation on one window-based platform and generic in concept across window-based platforms between which portability is desired.

In this example, the scroll bar 112 can also be a controller which is used to initiate, or control, the updating of a display of text from the text file 114 in response to movements of the mouse. That is, by "clicking" on the scroll bar and moving its image 112 vertically, the scroll bar serves as a controller which generates a stream of notifications that are sent to and used by the view 116 to continuously redraw the scroll bar as it is moved up and down the display, thereby changing the presentation of the scroll bar, and thus the contents of file 114 which are displayed. In the FIG. 1B example, the model (i.e., the text file 114) defines how user activation of the mouse will affect a displayed view of the scroll bar and thus the text file.

In a typical window-based system, such as the UNIX based X-Window System™ from the Massachusetts Institute of Technology, state changes within the system are communicated to graphical user interface clients via "events", in a manner similar to that described above with respect to the model-view-controller paradigm. When a window-based system is associated with an object oriented graphical user interface toolkit, the toolkit maps state changes in the window-based system, reported via window system events, onto an object oriented model-view-controller. The window-based system event results in a method invocation on an object of the graphical user interface to notify it of the state change.

The definition of the relationships between models, views, and controllers is established by implementation-specific definitions of object "classes". Although the relationships between particular instances of models, views and controllers can be dynamically specified during the lifetime of an application, these relationships are not alterable at the time of execution of a client-side application except through assignment between instances of particular implementations of the models and views. This is the case, for example, where object oriented systems are implemented in programming languages such as C++.

Because the interactions between objects are defined by a model-view-controller developed as a platform specific implementation for use with a specific window-based environment, the toolkit cannot be readily ported from one window-based platform to another. That is, an "event" found in a native window-based platform for which a toolkit was implemented can differ significantly in implementation from another window-based platform to which the toolkit is to be ported. Further, native implementations are simply not designed with portability to other environments as a goal, such that platform dependencies are not typically localized or abstracted within the native platform. An "event" defined for one platform is usually different in implementation with respect to other platforms in terms of the information which is provided (i.e., different semantics), as well as the format with which any such information is provided (i.e., different syntax). The amount of computer code which must be revised to use a toolkit defined for one window-based platform with another window-based platform is therefore excessive and impractical. As such, significant problems exist in porting an object oriented graphical user interface from a native window-based platform to another window-based platform (e.g., such as porting from the NeXTSTEP environment of NeXT Computer Company onto another window-based platform such as the X-Window Systems™).

Accordingly, it would be desirable to develop a method by which platform dependencies can be localized and abstracted for use with an object oriented graphical user interface, wherein object interactions are defined with respect to an abstract model-view-controller. For example, it would be desirable to abstract the events received from a window-based system so that the primary portions of code used to represent a toolkit of an object oriented graphical user interface can remain unchanged, and therefore be easily ported to any of a variety of window-based platforms.

SUMMARY OF THE INVENTION

The present invention is directed to providing an ability to re-host, or port, an object oriented graphical user interface implementation from a native window-based platform, or environment, to another window-based platform, or environment. In accordance with exemplary embodiments, any notifications (e.g., events, state changes or "interests") which occur in the native environment are abstracted as behavioral specifications. These behavioral specifications, (i.e., traits or protocols) can be used as part of a conformance negotiation to determine, during the execution lifetime of the graphical user interface, whether a particular client side object will conform with the behavioral specifications which have been abstracted from server side events associated with a different object. Where the conformance negotiation proves successful, abstracted notifications can flow between particular instances of objects to model the state of the system, rather than using native implementations of events. During the execution lifetime, other objects can dynamically establish relationships with object classes containing abstracted notifications for the purpose of receiving the abstracted notifications.

Exemplary embodiments of the present invention thereby create an abstraction layer within the native implementation that separates and localizes platform implementation dependencies throughout the toolkit of the object oriented graphical user interface. Exemplary embodiments significantly extend the client side model-view-controller paradigm and its application within user interfaces to reduce the magnitude of the porting task, and to accommodate porting of an interface among different window-based platforms.

Generally speaking, exemplary embodiments of the present invention are directed to a method and apparatus for porting a toolkit of a graphical user interface to a window-based platform, comprising the steps of: receiving a native notification of a state change from a window-based platform; and representing said native notification as an abstracted notification during execution of the graphical user interface, said abstracted notification constituting a behavioral specification of the native notification which is independent of implementations specific to said window-based platform. In accordance with the present invention, arbitrary implementations of models, views and controllers arbitrarily conform to abstracted notifications. Abstracted notifications which have been defined in the object oriented graphical user interface toolkit can be implemented using a programming language of the graphical user interface. Thus, a toolkit established as part of a graphical user interface can be quickly and cost-effectively ported across any of a variety of window-based systems.

BRIEF DESCRIPTION OF THE DRAWINGS

The foregoing and other features of the present invention will become apparent to those skilled in the art upon reading the following description of preferred embodiments of the invention in conjunction with the accompanying drawings, wherein.

DETAILED DESCRIPTION OF THE PREFERRED EMBODIMENTS

Figure 1A:
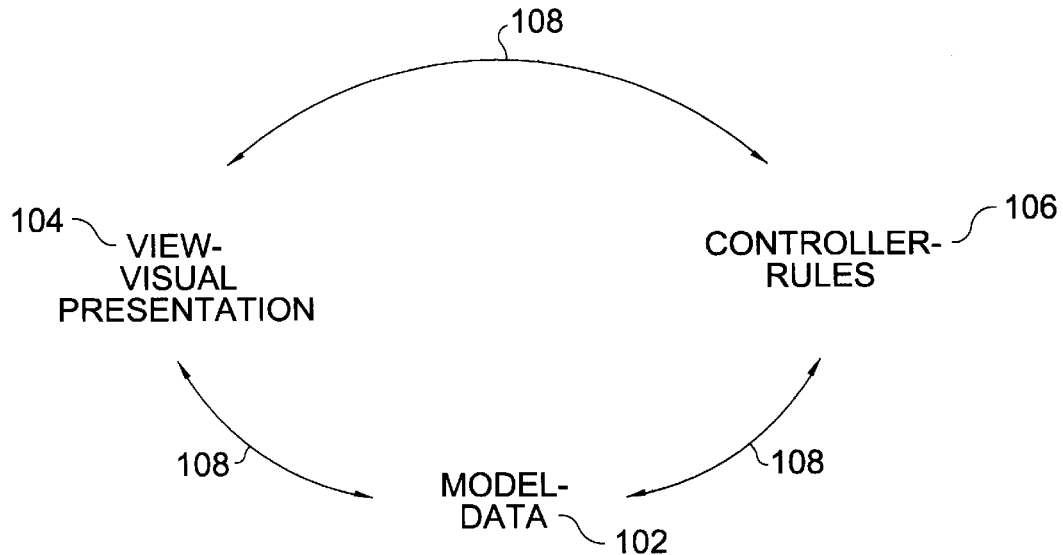
FIG. 1A shows an abstract representation of a model-view-controller paradigm.
Figure 1B:
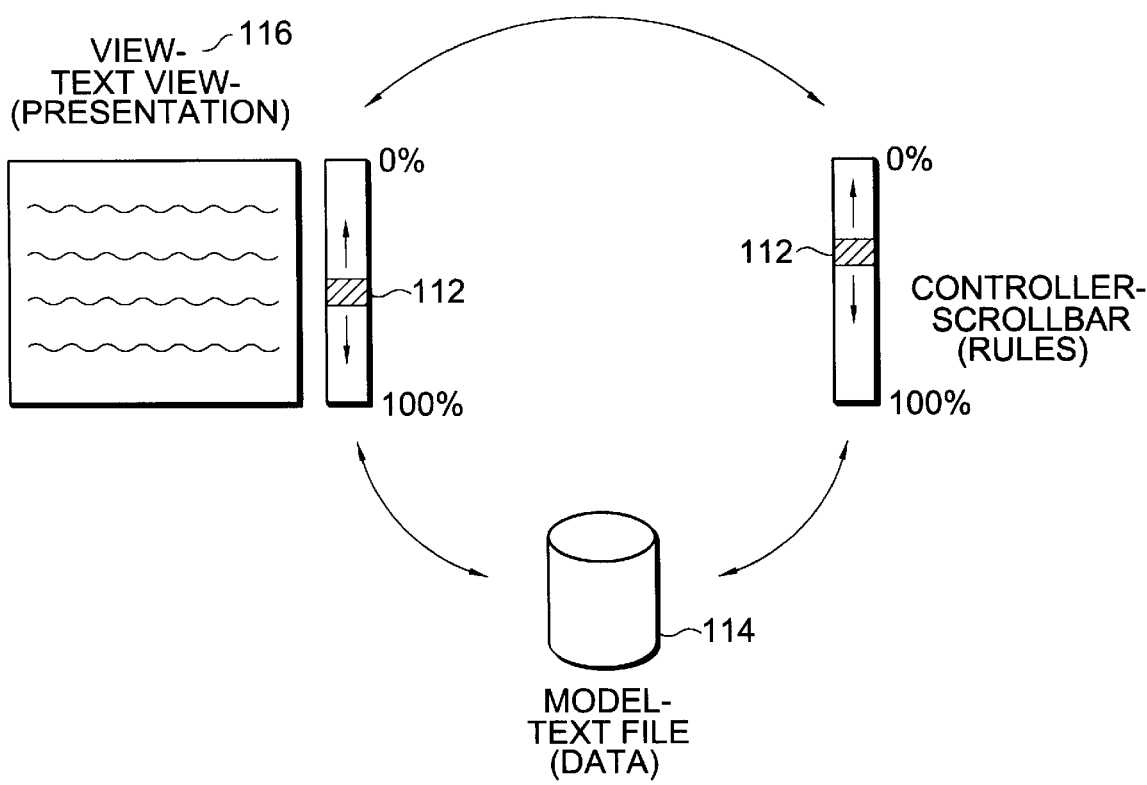
FIG. 1B is an exemplary application of the abstract representation shown in FIG. 1A.
Figure 2:
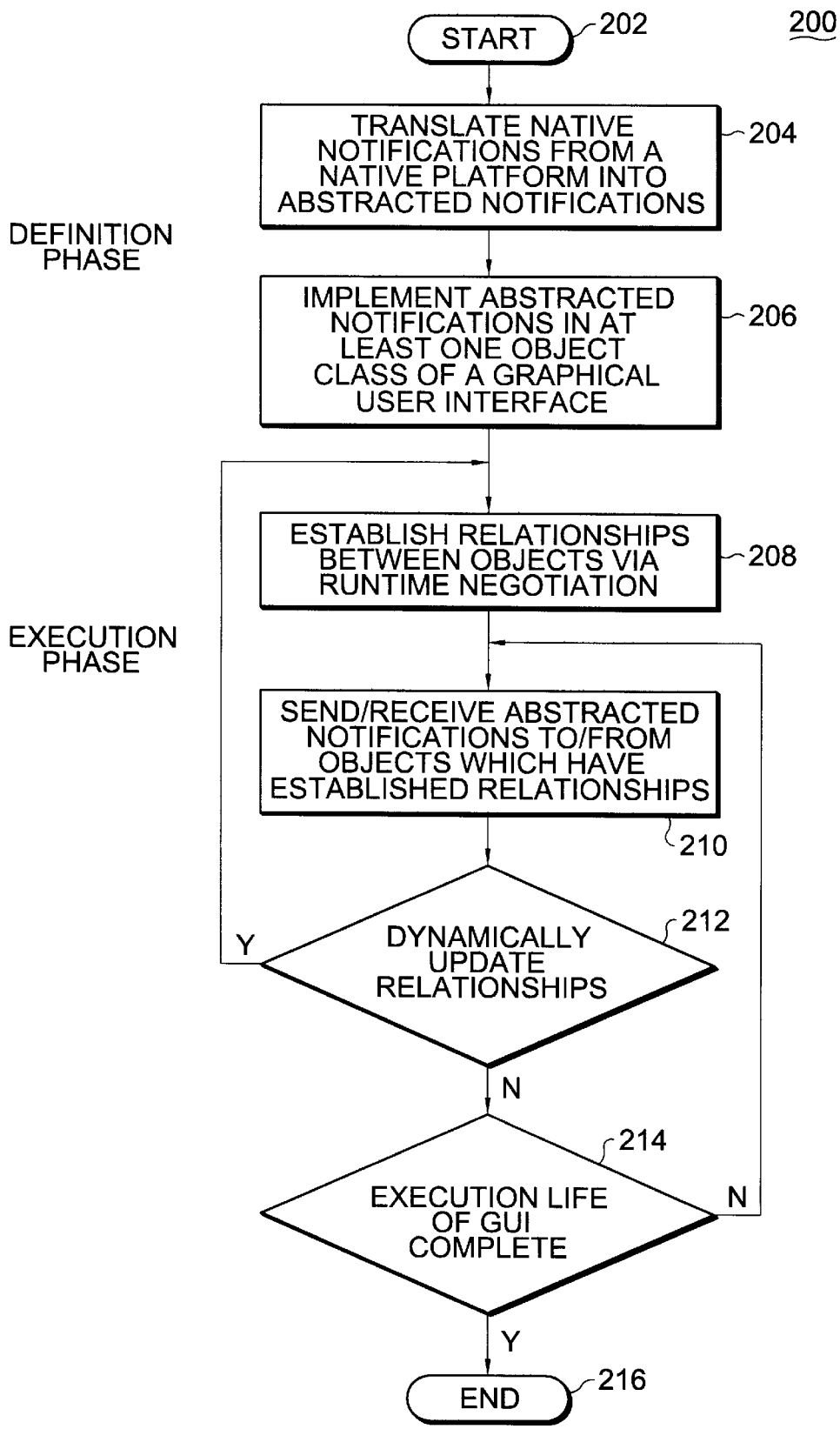
FIG. 2 illustrates an exemplary flowchart for porting a user interface from a first window-based platform to a second window-based platform in accordance with an exemplary embodiment of the present invention.

FIG. 2 illustrates an exemplary flowchart 200 for porting a toolkit of a graphical user interface to a window-based platform (e.g., from a first window-based platform to a second window-based platform). A first phase of the FIG. 2 flowchart constitutes a definition phase wherein the toolkit is defined using abstracted notifications of a window-based platform. A second phase of the FIG. 2 flowchart constitutes an execution phase, during which notifications from any window-based system are represented as abstract notifications used to establish interaction between the window-based system and the graphical user interface toolkit.

The start block 202 and steps 204 and 206, constitute the definition phase, while the remaining steps constitute the execution phase. In step 204 of the FIG. 2 flowchart, one or more native notifications (i.e., events, state changes or "interests") implemented with respect to a first window-based platform (i.e., the native platform) are translated into abstracted notifications for use in defining the graphical user interface. As a result, each object of the graphical user interface toolkit can be registered with an abstracted notification received from any of plural window-based platforms.

As those skilled in the art will appreciate, a notification can correspond to an event such as a key stroke, activation of a push button, an iconified window, and so forth. The events received from the host window-based platform to indicate state changes are, in accordance with exemplary embodiments, encapsulated into abstract notifications represented as functional signatures of object interface definitions. The functional signature used to represent an abstract notification constitutes a behavioral specification (e.g., formal trait or protocol) to which model, view and controller object implementations can be made to conform.

The model-view-controller paradigm is further extended to support multiple views expressing the same interest on a single model or controller, and to support single views that can express interests on multiple models or controllers. That is, multiple objects of the graphical user interface can be registered with an abstract notification received from any of multiple window-based platforms.

In step 206 of the definition phase, the notifications are implemented (e.g., expressed formally in an implementation language of the graphical user interface) as a behavioral specification using arbitrary object implementations. That is, an abstracted notification is implemented in at least one object class of the graphical user interface via the behavioral specification. However, the abstracted notification can be passed between objects of arbitrary implementation within the object oriented graphical user interface toolkit.

Due to the implementation of the abstracted notifications as behavioral specifications supported by the implementation language, arbitrary instances of objects conforming to the behavioral specifications can dynamically establish arbitrary relationships with other objects conforming to the same behavioral specifications over the execution lifetime of the graphical user interface, thereby creating a highly portable system. More particularly, the encapsulation of events into functional signatures is exploited to implement an object conformance verification. By encapsulating events of the native window-based system as functional signatures which are intended to correspond to interface definitions of one or more objects, conformance of any given object with an event received from any window-based system can be verified during the execution lifetime of the graphical user interface in which the object is deployed.

Following the definition phase, an execution phase can be initiated wherein the graphical user interface toolkit interacts with any window-based system (i.e., the native platform used to implement the toolkit or any other window-based platform). This is represented by step 208, wherein a relationship between the at least one object with other objects can be dynamically established using conformance verification during runtime of an application.

Conformance among objects is established by verifying conformance of each object with the abstracted notification using dynamic (i.e., runtime) binding mechanisms, such as those exhibited by such programming languages as objective C. These dynamic binding mechanisms are used to formally define the notifications in the implementation language of the native window-based platform. As such, arbitrary implementations of models, views and controllers which conform with an arbitrary notification are provided. In accordance with the present invention, conformance verification is established using a runtime negotiation with an arbitrary object.

Once relationships have been established between objects, the objects can freely send and receive notifications as represented by step 210. As those skilled in the art will appreciate, the runtime negotiation can be performed with respect to any number of arbitrary objects, to thereby establish and destroy dynamic polymorphic relationships during the execution lifetime of the object oriented graphical user interface, as represented by steps 212 and 214.

Thus, in accordance with exemplary embodiments, the model-view-controller paradigm of the graphical user interface is extended into an "interest" model, wherein views can express different interests in multiple models and controllers. The foregoing steps can be repeated via the loops associated with steps 212 and 214 for any number of ongoing notifications, until the execution life of the graphical user interface is completed in "End" step 216.

In accordance with exemplary embodiments, an object oriented graphical user interface is easily and dynamically ported to any of a variety of window-based systems. That is, a graphical user interface toolkit can be dynamically ported from a native environment for which it was originally implemented (e.g., Microsoft™ Windows) to any other target window-based platform (e.g., the X window System™), without encountering the traditional difficulties associated with rehosting a toolkit from one platform to another.

In accordance with exemplary embodiments, abstractions are used to remove system dependencies upon conceptual and implementation features of the native platform that have no direct counterpart in the target platform. The counterpart implementation features significantly undermined a traditional rehosting of a graphical user interface, since the features in question were fundamental to the graphical user interface system and were widespread in their deployment within the original implementation. Thus, the amount of effort typically required to initially port the implementation code, and to maintain it, was quite costly. However, in accordance with exemplary embodiments of the present invention, significant differences between a native platform and a target platform are handled using abstracted behavioral specifications to, for example, notify a client-side of window-based system state changes which affect the client-side.

Figure 3:
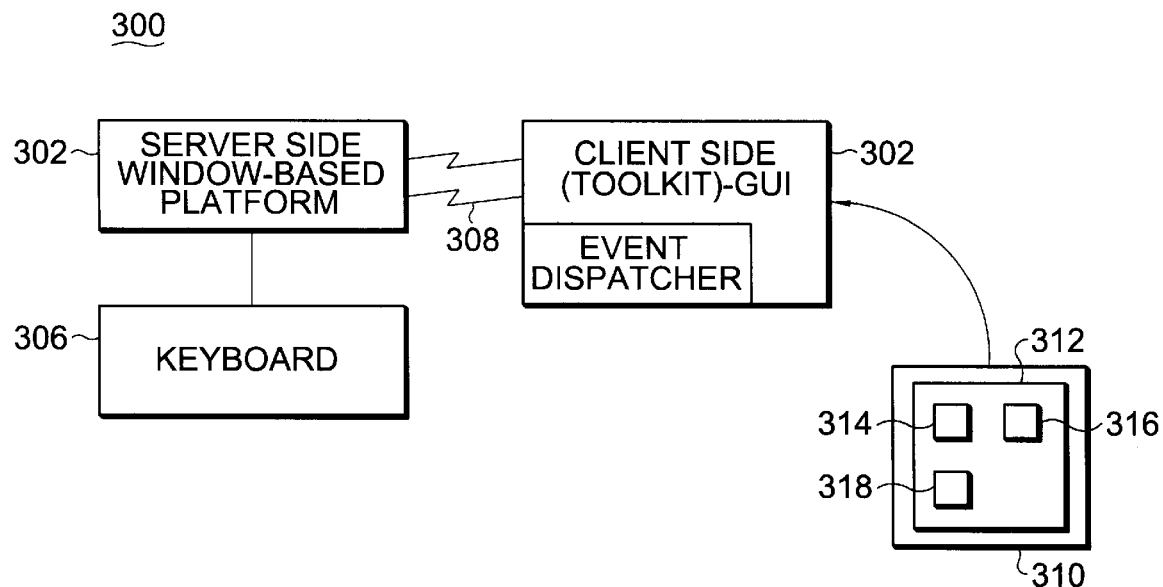
FIG. 3 illustrates an exemplary system configured in accordance with the present invention for porting a client-side interface from a first window-based platform to a second window-based platform.

FIG. 3 illustrates an exemplary system for implementing the flowchart of FIG. 2. The exemplary FIG. 3 system 300 includes a server side 302, a client-side 304 and peripheral inputs 306 to the server side, such as a keyboard and/or mouse input. Notifications are passed from the window-based platform of the server side to the graphical user interface on the client side via an interprocess communication connection 308. In the FIG. 3 system, window-based platform events, such as a keyboard actuation, actuation of an iconified window, or a mouse movement, are represented (e.g., translated) by the client side toolkit as abstract notifications.

As described with respect to FIG. 2, events of a window-based system are not merely passed to an object of the graphical user interface as was the case with traditional systems. Rather, each object of the graphical user interface must initially register an interest during a runtime negotiation with abstractions (i.e., behavioral specifications) of one or more notifications that can be received from a window-based system. In the FIG. 3 example, an event dispatch object of the graphical user interface is used to map abstracted notifications from the window-based platform to one or more arbitrary objects of the graphical interface that have registered an interest in a particular notification during a runtime negotiation.

In operation, when the event dispatch object receives a concrete event from the window-based platform of the server-side, it maps this event into an abstract notification, and passes the abstract notification onto one or more objects of the graphical user interface. As a result, any objects which initially registered themselves as having an interest in the notification will receive the notification. Thus, the event dispatch object constitutes a mechanism for passing the notifications to client-side objects.

As those skilled in the art will appreciate, the functionality described above can be implemented on any computer readable medium. For example, such a medium can be resident in the graphical user interface 304 of FIG. 3, or can be resident in a computer readable medium that can be used in conjunction with the graphical user interface 304. In this latter case, a computer programmed product 310 can be encoded with a computer program for porting a toolkit of a graphical user interface to a window-based platform. The computer programmed product can, for example, include a computer readable storage medium 312 for storing data, such as the abstractions of the notifications from the native window-based platform and/or, a table for mapping events from the target window-based platform to the various abstracted notifications.

The computer programmed product 310 can further include a computer code mechanism embedded in the computer readable storage medium for causing the computer readable storage medium to execute the computer code. For example, the computer code mechanism can include a first computer code device 312 configured for receiving a native notification of a state change from a window-based platform, and a second computer code device 314, coupled to the first computer code device, for representing the native notification as an abstracted notification during execution of the graphical user interface. As described previously, the native notification can be mapped to one or more abstracted notifications. The abstracted notifications, in accordance with exemplary embodiments, constitute a behavioral specification of the native notification which is independent of implementations specific to both the native and the target window-based platforms.

In the exemplary FIG. 3 embodiment, the computer code mechanism can include any number of computer code devices. For example, a third computer code device 318 can be included for verifying conformance of at least one object in the graphical user interface toolkit with the behavioral specification constituted by the abstracted notification.

The foregoing features will be further illustrated with respect to the following example. Assume that a user activates a key on the keyboard of the peripheral input 306. This action results in the sending of a keypress event from the window-based platform to the graphical user interface on the client-side. The keypress event includes two significant aspects: (1) the semantics of the event; and (2) the format, or syntax, of the event. The keypress event is transferred to the client side via the interprocess communication connection 308.

As the keypress event is received by the object oriented graphical user interface of the client-side, the event dispatch object looks at the information and determines where it should be forwarded. The event dispatch object then forwards the information accordingly. For example, where the keypress corresponded to a depressing of the letter "A" key in combination with the "shift" key (i.e., to signify an upper case "A"), the event dispatch object will, upon receipt of the keypress event information, pass information representing an "A" to a text field which then implements the drawing of an "A" on a display. That is, the event information is represented as an abstract notification which can be directed to objects that have registered an interest in the abstract notification via a runtime negotiation.

In accordance with exemplary embodiments of the present invention, the toolkit has been implemented with respect to notifications of events which have been abstracted to represent only behavioral specifications of the events which will necessarily exist in any window-based implementation (i.e., a functional signature). For example, the semantics and syntax which would have typically been encapsulated in an event, and thereby restricted portability of the event to an object oriented interface implemented for a different window-based platform, are eliminated. Rather, the event is abstracted such that it is independent of implementations specific to any particular window-based system (i.e., it is no longer specific to the native platform for which it was originally intended). Only information of the notification which is common to: (1) the native window-based platform; and (2) a target window-based platform to which the toolkit has been ported is used to recognize and correlate the event with an object on the client-side. In the foregoing example, common information extracted from the event may merely result in denoting which letter was depressed (i.e., "a") as the behavioral specification for mapping the notification to an object on the client-side.

To illustrate the abstracting of an event, a simplified example will be provided with respect to the encoding of events associated with a button (e.g., keypress events). The code fragments set forth in the example express constructs readily familiar to those skilled in the art. The example demonstrates the abstracting of two different concrete window system events into a single "abstract" representation, and the expressing of that representation as a formal protocol between event sources and sinks. The example highlights the practical application of the invention in localizing platform dependencies, resulting in the majority of the graphical user interface framework becoming platform independent, and creating a formal protocol between event sources and sinks that results in a robust dynamic event model where relationships between sources and sinks can be modified during the lifetime of an application.

For this example, consider the X Window System™ and the NeXTSTEP™ Window system wherein there exists a concrete window system event notification of a mouse, or pointer button press event. In both systems, this event notification is delivered from the window system server to a client application that has been selected for receiving such notifications from the system, via platform dependent application program interfaces and interprocess communications mechanisms. However each system has semantically different concrete representations for such notifications, both in terms of their syntax and semantics. For example, in the X Window System the event is described by the following C type definition and constants (for details, see "The X Window System", by Scheifler & Gettys, Digital Press, 1992 ISBN 1-55558-088-2):

```
typedef struct {
int           type;           // == ButtonPress
unsigned long serial;         // serial number of last request processed
Bool          send_event;     // synthetically generated
Display*      display;        // window server client reference
Window        window;         // the window the event is delivered to
Window        root;           // root window of screen
Window        subwindow;      // the window in which the event
                                 occurred
Time          time;           // server timestamp
int           x,              // pixel based, origin top left
              y;
int           x_root,         // screen relative coords
              y_root;
unsigned int state;           // state of keybd modifiers
unsigned int button;          // which button is pressed?
Bool          same_screen;
} XButtonEvent;
typedef XButtonEvent XButtonPressedEvent;
typedef XButtonEvent XButtonReleasedEvent;
/* constant for "type" field above */
#define ButtonPress     4
/* constants for "state" field above */
#define ShiftMask       (1 < < 0)
#define LockMask        (1 < < 1)
#define ControlMask     (1 < < 2)
#define Mod1Mask        (1 < < 3)
#define Mod2Mask        (1 < < 4)
#define Mod3Mask        (1 < < 5)
#define Mod4Mask        (1 < < 6)
#define Mod5Mask        (1 < < 7)
/* constants for "button" field above */
#define Button1         1
#define Button2         2
#define Button3         3
#define Button4         4
#define Button5         5
```

In the NeXTSTEP Window System the Button event is defined as follows (for details, see "NeXTSTEP General Reference (volume 2)" by NeXT Computer Inc, Addison Wesley, 1992 ISBN 0-201-62221-1):

```
/* EventData type: defines the data field of an event */
typedef union {
    struct {                        /* For mouse events */
        short       reserved;
        short       eventNum;       /* unique identifier for this
                                       button */
        int         click;          /* click state of this event */
        unsigned char pressure;     /* pressure value:
                                       0=none,
                                       255=full */
        char        reserved1;
        short       reserved2;
    } mouse;
    /* other event type data deteted for clarity */
} NXEventData;
/* The event record! */
    typedef struct {
        float x;
        float y;
    } NXPoint;
    typedef struct_NXEvent {
        int         type;           /* An event type from
                                       above */
        NXPoint     location;       /* Base coordinates in
                                       window, from lower-left */
        long        time;           /* vertical intervals since
                                       launch */
        int         flags;          /* key state flags */
        unsigned int window;        /* window number of
                                       assigned window */
        NXEventData data;           /* type-dependent data */
        DPSContext  ctxt;           /* context the event came
                                       from */
    } NXEvent, *NXEventPtr;
/* constants for "type" field above */
#define NX_LMOUSEDOWN       1       /* left mouse-down
                                       event */
#define NX_LMOUSEUP         2       /* left mouse-up
                                       event */
#define NX_RMOUSEDOWN       3       /* right mouse-down
                                       event */
#define NX_RMOUSEUP         4       /* right mouse-up
                                       event */
#define NX_MOUSEMOVED       5       /* mouse-moved
                                       event */
#define NX_LMOUSEDRAGGED    6       /* left mouse-dragged
                                       event */
#define NX_RMOUSEDRAGGED    7       /* right
                                       mouse-dragged event */
#define NX_MOUSEDOWN        NX_LMOUSEDOWN
                                    /* Synonym */
#define NX_MOUSEUP          NX_LMOUSEUP
                                    /* Synonym */
#define NX_MOUSEDRAGGED     NX_LMOUSEDRAGGED
                                    /* Synonym */
/* constants for "flags" field above */
#define NX_ALPHASHIFTMASK
                                    (1 << 16) /* if alpha
                                       lock is on
#define NX_SHIFTMASK        (1 << 17) /* if shift key
                                       is down
#define NX_CONTROLMASK      (1 << 18) /* if control
                                       key is down */
#define NX_ALTERNATEMASK    (1 << 19) /* if alt key is
                                       down
#define NX_COMMANDMASK      (1 << 20) /* if command
                                       key is down */
#define NX_NUMERICPADMASK   (1 << 21) /* if key on
                                       numeric pad */
#define NX_HELPMASK         (1 << 22) /* if help key
                                       is down
/* Device-dependent bits */
#define NX_NEXTCTRLKEYMASK  (1 << 0) /* control key
#define NX_NEXTLSHIFTKEYMASK
                                    (1 << 1) /* leftside
                                       shift key
#define NX_NEXTRSHIFTKEYMASK
                                    (1 << 2) /* right side
                                       shift key
#define NX_NEXTLCMDKEYMASK
                                    (1 << 3) /* leftside
                                       command key */
#define NX_NEXTRCMDKEYMASK
                                    (1 << 4) /* right side
                                       command key */
#define NX_NEXTLALTKEYMASK  (1 << 5) /* left side alt
                                       key
#define NX_NEXTRALTKEYMASK  (1 << 6) /* right side
                                       alt key
#define NX_STYLUSPROXIMITYMASK
                                    (1 << 7) /* if stylus is
                                       in proximity
                                     * (for tablets) */
#define NX_NONCOALSESCEDMASK
                                    (1 << 8) /* event was
                                       generated with event
                                       coalescing disabled */
```

It is apparent from the definitions above that the two implementations differ significantly in both their concrete syntax and semantics. Thus, these definitions cannot be used in their native form to create an implementation of a graphical user interface toolkit that is portable between both platforms without comprehensive conditional compilation directives to create parallel implementations for each target window system. However, in accordance with exemplary embodiments of the present invention, a common definition for a button press event can be abstracted that will be portable across both window systems, making the vast majority of the code implementing the toolkit platform independent, through the localization of the platform dependent code into a single, or relatively few components of the toolkit.

Given the concrete window system event notifications defined above, a first step of an implementation according to the exemplary embodiments is to define a common abstraction of the concrete events. This example will use the Objective-C programming language since this is the implementation language used in programming systems such as NeXTSTEP and OpenStep (for the X Window System). An abstract event is used to define the event type, its source, and other fundamental information common to all event abstractions:

```
@interface AbstractEvent : Object
{
    enum {
        AEButtonPress,
        AEButtonRelease,
        AEMouseMoved,
        // ...
    }           eventType;
    SystemEventDispatcher  eventDispatcher; // object
                                that maps and dispatches
                                events from the platform
                                window system. //
    unsigned int   eventSerial; // serial number
    unsigned long  eventTimestamp; // system
                                timestamp
}
// ...
@end
```

Next, the concept of an event associated with a "window" is introduced; that is, a concept common to both target platforms:

```
@interface AbstractWindowEvent : AbstractEvent
{
       unsigned int eventWindow;   // id of window event
                                   occurred on
}
// ...
@end
```

Finally, a particular abstraction is defined for a button press event, containing information relevant to both target platforms, but with a synthesized syntax and semantics distinct from those found in the concrete events:

```
typedef enum {
      AKbdEShiftModifier = (1 < 0),
      AKbdECtrlModifier = (1 < 1),
// ...
} AKbdEventModifiers;
@interface AbstractButtonPressEvent : AbstractWindowEvent
{
      float         eventX;
      float         eventY;
      enum {
          ABPELeftButton,
          ABPEMiddleButton,
          ABPERightButton
      }             eventButton;
      AKbdEventModifiers    eventKbdModifiers;
}
// ...
@end
```

A hierarchy of abstract window system event objects, recognizable to those skilled in the art, has thus been defined as containing a synthesis of the information found in the concrete event systems of the X Window System and the NeXTSTEP Window System for mouse button press events. Next, an interface to an object hierarchy is defined that allows an arbitrary object (the observer or sink) to express an interest in observing notifications from another object (the observee or source) via a particular protocol or interface specification:

```
        @interface Object(InterestProtocolRegistration)
        - (Bool) addObserver: (Object *) observer
             forProtocol: (Protocol*) interestProtocol;
        - (Bool) removeObserver: (Object *) observer
             forProtocol: (Protocol*) interestProtocol;
        @end
```

A set of protocols is then defined based upon the abstract event definitions. These protocols describe the formal interface between arbitrary objects that may emit and receive notifications of changes in state of the system as represented by the abstract event descriptions detailed above.

```
@protocol AbstractEventObserverProtocol
- (void)  gotEvent: (AbstractEvent*) theEvent
       fromSource: (Object              *) theEventSource;
@end
@protocol AbstractWindowEventObserverProtocol
- (void) gotWindowEvent: (AbstractWindowEvent*)
theWindowEvent
```

```
       fromSource: (Object          *) theEventSource;
@end
@protocol AbstractButtonPressEventObserverProtocol
- (void) gotButtonPressEvent: (AbstractButtonPressEvent*)
theWindowEvent
             fromSource: (Object              *)
             theEventSource;
@end
```

Having defined these abstract protocols, a "ButtonControl" object that wishes to receive these notifications can be defined:

```
@interface ButtonControl : Control
<AbstractButtonPressEventObserverProtocol,
AbstractWindowEventObserverProtocol,
                                       // ...
                                  >
// ...
- (ButtonControl) newButtonControl;
- (void)   dealloc;
- (void)  gotButtonPressEvent: (AbstractButtonPressEvent*)
theWindowEvent
             fromSource: (Object     *)
             theEventSource;
- (void) gotwindowEvent: (AbstractWindowEvent*)
             theWindowEvent
             fromSource: (Object *)
             theEventSource;
// ...
@end
```

Relevant parts of the implementation are then provided:
```
@implementation ButtonControl
- (ButtonControl) newButtonControl
{
```

This method creates a new instance of a ButtonControl. As a side effect, the ButtonControl registers itself with the toolkit's "eventDispatcher" object to receive notifications of ButtonPress events.

self=[super init];

Now, this object is registered with the window system event dispatcher in order to receive the protocol notifications.

```
     [[SystemEventDispatcher eventDispatcher]
         addObserver: self
         forProtocol:
     @protocol(AbstractButtonPressEventObserverProtocol)
     ];
         return (ButtonControl*)self;
}
- (void) dealloc
{
```

This method is called to free instances of the ButtonControl. As a side effect, the ButtonControl removes itself from the eventDispatcher object:

```
     [[SystemEventDispatcher eventDispatcher]
         removeObserver: self
         forProtocol:
     @protocol(AbstractButtonPressEventObserverProtocol)
     ];
     [super dealloc];
}
- (void) gotButtonPressEvent: (AbstractButtonPressEvent*)
thewindowEvent
        fromSource: (Object*
```

```
            theEventSource
    {
        // this method get invoked when a Button Press occurs
          on this
        // Control ...
        // .... do ButtonControl activation processing here ...
    }
    @end
```

Having defined the graphical user interface toolkit objects in terms of these abstract protocols, the "SystemEventDispatcher" class is implemented. For the present example, this is the only class in the event subsystem of the graphical user interface toolkit that includes window system dependent code:

```
    @interface SystemEventDispatcher : Object
    + (SystemEventDispatcher) eventDispatcher;
    - (void) run;
    - (Bool) addObserver: (Object *) observer
      forProtocol: (Protocol*) interestProtocol;
    - (Bool) removeObserver: (Object *) observer
      orProtocol: (Protocol*) interestProtocol;
    - (void) dispatchAbstractEvent: (AbstractEvent*) absev;
    @end
```

A class private interface to the SystemEventDispatcher is defined that encapsulates all of the platform dependent code:

```
    @interface
    SystemEventDispatcher
    (PlatformDependentStuff)
    @private
    #ifdef XWindows
    - (XEvent) _nextXEvent;   // fetches
      next XEvent from X
            Window server
    - (void) _mapXEvent: (XEvent*  ) xEvent
      OntoAbstractEvent: (AbstractEvent **)
      returnEvent;
    // ...
    #endif
    #ifdef NeXTSTEP
    - (NXEvent) _nextNXEvent;
    // fetches next NXEvent from
            NeXTSTEP DPS
    - (void) _mapNXEvent: (NXEvent*  )
    nxEvent
        OntoAbstractEvent: (AbstractEvent **)
        return Event;
    // ...
    #endif
    // ...
    @end
    @implementation SystemEventDispatcher
    {
        // ...
        HashTable* button PressEventObservers;
        // contains all
        Controls
                        // interested in
                          button
                        // press events
                          hashed by
                        // window id.
        // ...
    }
    + (SystemEventDispatcher) eventDispatcher
    {
        // create a new instance of a system event
          dispatcher
        static SystemEventDispatcher*
          eventDispatcher = nil;
        if (eventDispatcher = = nil) {
            eventDispatcher = [[SystemEventDispatcher
                alloc] init];
        }
        return eventDispatcher;
    }
    - run
    {
        // run the event dispatcher, fetching events from
          the system,
        // mapping them from the platform specific
          form into the
        // abstract mapping and subsequently
          dispatching them to all
        // eligble observers ...
        for (;;) {
            AbstractEvent*  absev;
    #ifdef XWindows
            [self _mapXEvent: [self _nextXEvent]
                OntoAbstractEvent: &absev
            ];
    #endif
    #ifdef NeXTSTEP
            [self _mapNXEvent: [self _nextNXEvent]
                OntoAbstractEvent: &absev
            ];
    #endif
            [self dispatchAbstractEvent: absev];
        }
    }
    - (void) dispatchAbstractEvent:
    (AbstractEvent*) absev
    {
        // dispatch abstract events to eligible observers
        switch ([absev eventType] {
            // ...
            case AEButtonPress:
                // Find the COntrol associated with the
                  window id
                // of the abstract event and dispatch the
                  event
                // to it ...
                Control* c = [button PressEventObservers
                        valueForKey: [absev
                          eventWindow]
                    ];
                [c gotButtonPressEvent: absev
                        FromSource: self
                    ];
                break;
                // ...
        }
    }
    - (Bool) addObserver: Object* observer
        forProtocol: Protocol* interestProtocol
    {
        // register observer (if eligble) for particular
          observer protocol
        // ...
        if (interestProtocol = =
    @protocol
    (AbstractButtonPressEventObserverProtocol)
    &&
            [observer conformsTo: interestProtocol]) {
                // if the observer conforms to the protocol
                  save it in a
                // hash table indexed by its window
                  identifier.
                [buttonPressEventObservers
                    insertKey: (const void *) [observer
                      window];
                    value: (void  *) observer
                ];
        }
        // ...
        return (Bool)True;
    }
    // ...
    @end
    @implementation
```

-continued

```
SystemEventDispatcher
(PlatformDependentStuff)
#ifdef XWindows
// ...
- (void) _mapXEvent: (XEvent*  ) xEvent
    OntoAbstractEvent: (AbstractEvent **)
    returnEvent
{
    // platform dependent code to map system
    events onto event abstractions
    switch (xEvent->type) {
        // ...
        case ButtonPress: {
            XButtonPressedEvent* xPress =
                (XButtonpressedEvent*)xEvent;
            // create a new AbstractButtonPressEvent
            *returnEvent = [AbstractButtonPressEvent
            new];
            // here we initialize the member vars of
            the
            // AbstractButtonPressEvent based upon
            the
            // platform dependent information found
            in the
            // XButtonPressedEvent
            // ...
        }
        break;
        // ...
    }
}
// ...
#endif
#ifdef NeXTSTEP
// ...
#endif
@end
```

A simple exemplary "main" program demonstrates a ButtonControl that will receive abstract notifications of button presses from the SystemEventDispatcher:

```
int main(const int argc, const char **const argv)
{
    [ButtonControl newButtoncontrol]; // create a
    ButtonControl
    [[SystemEventDispatcher eventDispatcher] run]; // run
    the dispatcher
}
```

In accordance with the present invention, the abstract notification of behavioral specifications, in conjunction with the event dispatch object, provides an ability to runtime negotiate whether a particular object in the graphical user interface toolkit conforms to the notification, as described with respect to step 208 of FIG. 2. The ability to provide runtime conformance testing, referred to herein as runtime negotiation, allows relationships between objects in a view field versus objects in a control or model field to change dynamically during the execution lifetime of the system. In the exemplary FIG. 3 system, runtime negotiation allows relationships to be dynamically altered (i.e., established and de-established) via a remapping within the event dispatch object.

Figure 4:
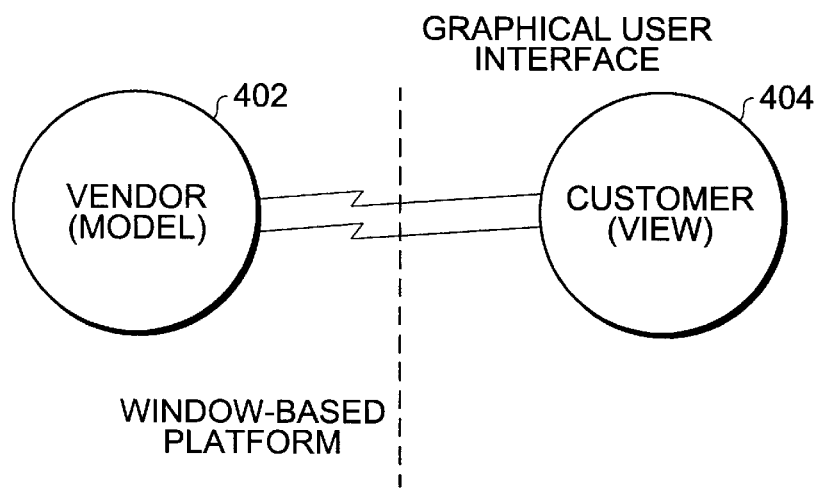
FIG. 4 is a graphic illustration of aspects of the invention.

To better illustrate the foregoing features, and in particular the runtime negotiation feature, consider two anonymous objects: one in a window-based platform and the other in the graphical user interface. The two objects know only of each other's existence and nothing else. The two objects will be referenced herein as a "vendor" and as a "customer". A vendor 402 and a customer 404 are graphically illustrated in FIG. 4.

Assuming that the behavioral specification of the vendor includes a protocol which the customer (e.g., the customer of a client-side application) wants to use, such as a keypress event, the vender must be able to export some notification of keypress events to the customer. The customer knows of the vender's existence, and is interested in entering a runtime negotiation to verify its ability to pass information (e.g., notifications) to the vender. The customer therefore needs to know if the vender conforms with the customer's behavioral specifications.

Given this starting position, the runtime negotiation is initiated by the customer querying the vender as to whether it vends the behavioral specification "A" (i.e., the protocol which the customer wants to use). If the vender does not vend the behavioral specification "A", the customer discontinues its attempt to establish an information transfer with the vender. However, if the vender indicates that it does vend the behavioral specification "A", the customer registers an "interest" with the vender for the behavioral specification corresponding to "A". Because the vender supports this behavioral specification, the customer informs the vender that it wants to participate in this behavioral specification with the vender so that the vender can transfer information to a view of the customer, whenever state changes associated with this behavioral specification occur.

Once the customer confirms that it wants to participate in the behavioral specification and negotiate with the vender to receive notifications regarding state changes, the vender queries the customer as to whether it conforms (i.e., adheres) to the behavioral specification "A". Assuming that the customer does conform with the behavioral specification "A", a relationship (i.e., runtime contract) is established, such that abstract notifications can flow between these two objects.

In accordance with exemplary embodiments, at any time during the execution life of the system, the vender and/or customer can withdraw from the relationship. That is, either object can remove itself from the relationship. Such a removal may be desirable if, for example, the customer completes its job and resigns from the relationship. If either object resigns from the relationship, then new relationships can be established in the manner already described.

Figure 5:
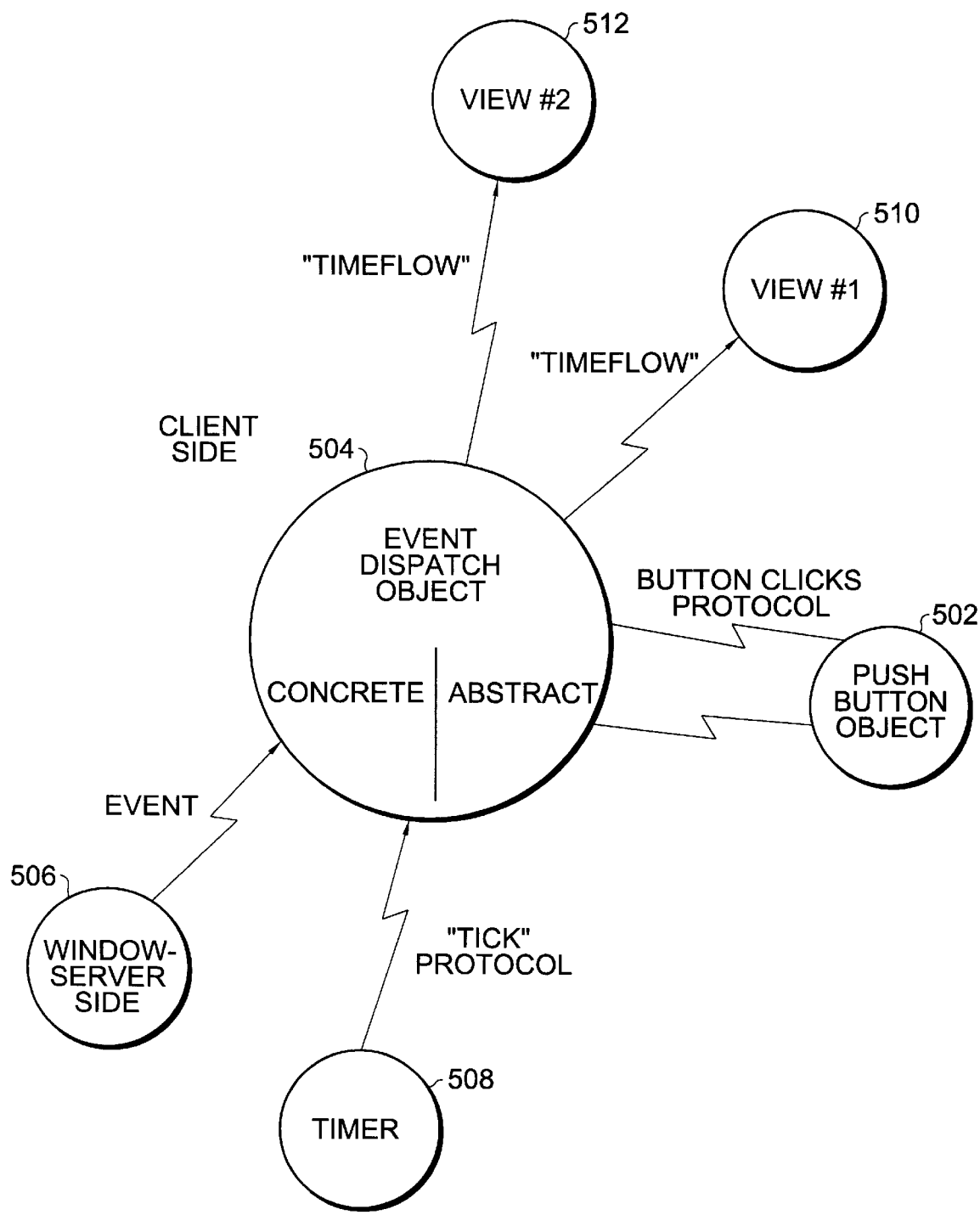
FIG. 5 illustrates a graphical depiction of an ability of a system configured in accordance with the present invention to dynamically establish relationships between arbitrary instances of objects conforming to a given behavioral specification with other objects conforming to the same behavioral specification.

Having described an exemplary runtime negotiation, attention is now directed to an exemplary mapping of objects to one another in accordance with the present invention. In this regard, reference is made to FIG. 5, wherein an event corresponding to the activation of a push button on a display of a window-based system is to be used to trigger an event. In accordance with exemplary embodiments, concrete information corresponding to this event is mapped from the window-based platform into abstract information by the graphical user interface in the manner described previously. Here, a push button 502 is represented in a client-side object oriented graphical user interface as an object with corresponds to both a view and to a controller of the model-view-controller paradigm. As a view, it is responsible for drawing the push button on a display. As a controller, it describes state changes which occur to indicate that the push button is depressed or released.

Assume that the behavioral specification for the push button includes a protocol "Button Clicks", that produces two messages: (1) push button depressed; and (2) push button released. In the case of a push button, the abstracted notification can further include information which identifies the time at which it was depressed (i.e., a time stamp), keyboard modifiers which were activated with the push button (e.g., activation of the shift key with a letter key), or the position of a mouse at the time of push button activation (e.g., where the button on the mouse was activated). Assume further that the event dispatch object vends the "Button Clicks" protocol. During a runtime negotiation, the push button queries the event dispatch object as to whether it vends the "Button Clicks" protocol. If the event dispatch object 504 does vend this protocol, the push button responds by indicating that it wants to participate in the "Button Clicks" protocol with the event dispatch object. The push button therefore registers an "interest" in the "Button Clicks" protocol.

The event dispatch object next queries the push button as to whether it conforms to the "Button Clicks" protocol. If the push button answers affirmatively, a relationship is established. As such, when the event dispatch object receives a button press event from the window-based platform 506, it then notifies the push button of a "push button depress" event.

Because exemplary embodiments of the present invention abstract events, certain information which is implementation specific may, of course, be lost. However, in return for any lost information enhanced portability of the system is achieved. Further, as those skilled in the art will appreciate, any implementation specific information can be retained by specifically encoding this in the client-side object oriented graphical user interface for the platform specific implementation.

Referring again to FIG. 5, those skilled in the art will appreciate that when notifications are abstracted as described above, a 1:1 relationship between objects need not be maintained. Rather, all of the objects having an "interest" in the abstract notification can be mapped to receive the notification. For example, where the abstract notification corresponds to the output of a timer 508, an associated protocol "tick" can be established to inform the event dispatch object every time one second passes. A separate "Timeflow" protocol can then be established between the event dispatch object and all objects (e.g., objects 510 and 512) having an "interest" in tracking time. Such objects may include, for example, a clock on the display, a stock market ticker feed, a timer and so forth. The views of all objects having an interest in tracking time are thus notified of changes in time via the "Timeflow" protocol. Accordingly, even though the "tick" protocol has a 1:1 relationship with the event dispatch object, the "Timeflow" protocol represents a relationship of the event dispatch object with all objects having an interest in tracking time.

Those skilled in the art will appreciate that exemplary embodiments of the present invention can be implemented in many different ways. For example, exemplary embodiments can be used to port features of a graphical user interface to a window-based system implemented in either software or hardware. Further, although exemplary embodiments have been described in the context of a client server system, those skilled in the art will appreciate that features of the invention can be used to port a toolkit of a graphical user interface to any window-based system(s) regardless of where the window-based system(s) resides.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method for porting a toolkit of a graphical user interface to a window-based platform comprising the steps of:

receiving a native notification of a state change from a window-based platform;

representing said native notification as an abstracted notification during execution of the graphical user interface, said abstracted notification constituting a behavioral specification of the native notification which is independent of implementations specific to said window-based platform; and configuring said graphical user interface to, during execution of said graphical user interface, verify conformance of at least one object in the graphical user interface toolkit with said behavior specification;

registering at least one abstracted notification with at least one object of said toolkit dynamically during runtime execution of said graphical user interface, wherein said step of registering further includes a step of registering said abstracted notification with multiple objects of said toolkit dynamically during runtime execution of said graphical user interface toolkit.

2. A method according to claim 1, wherein said step of representing a native notification further includes a step of:

defining said behavioral specification as a functional signature of a window-based platform event.

3. A graphical user interface toolkit for use with a window-based platform, said graphical user interface toolkit comprising:

an input for receiving native notifications of state changes from a window-based platform; and a hierarchical collection of objects which establish relationships with abstractions of said native notifications that are represented as abstracted notifications, said abstracted notifications constituting behavioral specifications of the native notifications which are independent of implementations specific to said window-based platform, wherein said hierarchical collection is configured to verify conformance of said at least one object to said at least one abstracted notification during runtime execution of said graphical user interface toolkit;

wherein at least one of said abstracted notifications is registered with multiple objects of said hierarchical collection of objects.

4. A graphical user interface toolkit according to claim 3, further comprising:

an output for sending said abstracted notifications to the window-based platform.

5. A graphical user interface toolkit according to claim 3, wherein said hierarchical collection is configured to register at least one abstracted notification with at least one object of said hierarchical collection dynamically during runtime execution of said graphical user interface.

6. A graphical user interface toolkit according to claim 3, wherein said toolkit is implemented in a client side of client/server network.

7. A graphical user interface toolkit according to claim 3, wherein said native notifications of state changes in said window-based platform are provided to models, views and controllers used to define interactions between said objects of said hierarchical collection.

* * * * *